United States Patent [19]

Garner

[11] 4,152,891

[45] May 8, 1979

[54] PYROTECHNIC COMPOSITION AND METHOD OF INFLATING AN INFLATABLE AUTOMOBILE SAFETY RESTRAINT

[75] Inventor: Eugene F. Garner, Canyon Country, Calif.

[73] Assignee: Allied Chemical Corporation, Morris Township, Morris County, N.J.

[21] Appl. No.: 840,692

[22] Filed: Oct. 11, 1977

[51] Int. Cl.$^2$ ................................................ C06D 5/06
[52] U.S. Cl. ................................... 60/205; 149/77; 149/82; 149/83; 149/85
[58] Field of Search ..................... 149/77, 82, 83, 85

[56] References Cited

U.S. PATENT DOCUMENTS

| 3,723,205 | 3/1973 | Scheffee | 149/83 |
|---|---|---|---|
| 3,773,351 | 11/1973 | Catanzarite | 102/39 |
| 3,785,149 | 1/1974 | Timmerman | 149/83 X |
| 3,936,330 | 2/1976 | Dergazarian et al. | 149/82 |
| 3,964,255 | 6/1976 | Catanzarite | 149/77 X |
| 3,986,908 | 10/1976 | Grébert et al. | 149/83 |

*Primary Examiner*—Edward A. Miller
*Attorney, Agent, or Firm*—Roger H. Criss

[57] ABSTRACT

A pyrotechnic composition comprising:
  about 15 to 30% by weight of tartaric acid;
  about 40 to 75% by weight of sodium chlorate; and
  about 10 to 30% by weight of calcium hydroxide.

The invention also relates to a method of inflating an inflatable automobile safety restraint comprising the step of substantially completely inflating the restraint with the gaseous composition products of combustion of a composition comprising:
  about 15 to 30% by weight of tartaric acid;
  about 40 to 75% by weight of sodium chlorate; and
  about 10 to 30% by weight of calcium hydroxide.

10 Claims, No Drawings

PYROTECHNIC COMPOSITION AND METHOD OF INFLATING AN INFLATABLE AUTOMOBILE SAFETY RESTRAINT

CROSS REFERENCE TO RELATED APPLICATION

Reference is made to my co-filed application Ser. No. 840,693, entitled "Pyrotechnic Composition and Method of Inflating an Inflatable Automobile Safety Restraint".

BACKGROUND OF THE INVENTION

1. Field of the Invention

This invention relates to pyrotechnic compositions and especially such compositions which are useful in inflating an inflatable automobile safety restraint, as well as to methods for so inflating the restraint.

2. Description of the Prior Art

Various pyrotechnic formulations have been proposed for generating a gas upon combustion in order to inflate an air bag or similar safety restraint in a vehicle so as to restrain movement of an occupant in the event of a sudden deceleration of the vehicle, such as caused by a collision. Exemplary of the many patents issued in this area are the following U.S. Pat. Nos.: 3,785,149 to Timmerman; 3,897,285 to Hamilton et al.; 3,901,747 and 3,912,562 to Garner; 3,950,009 to Hamilton and 3,964,255 to Catanzarite.

In order to be employed as a pyrotechnic gas generating composition for inflatable occupant restraints, several criteria must be met. The pyrotechnic must be capable of producing non-toxic, non-flammable and essentially smokeless gases over a wide range of temperatures and other environmental conditions. The gases that are generated must be at a sufficiently low temperature so as not to destroy the restraint or injure the occupant. The pyrotechnic must be safe to handle, preferably with very low or no toxicity and must be capable of generating a substantial amount of gas within a very short period of time, e.g., less than about 100 milliseconds.

Although various compositions have heretofore been developed, it is of course desirable to provide a pyrotechnic composition and method of inflating an air bag or the like in which all of the above criteria are maximized.

SUMMARY OF THE INVENTION

In accordance with this invention, there is provided a pyrotechnic composition comprising:
 about 15 to 30% by weight of tartaric acid;
 about 40 to 75% by weight of sodium chlorate; and
 about 10 to 30% by weight of calcium hydroxide.

In further accordance with this invention, there is provided a method of inflating an inflatable automobile safety restraint comprising the step of substantially completely inflating the restraint with the gaseous composition products of combustion of a composition comprising:
 about 15 to 30% by weight of tartaric acid;
 about 40 to 75% by weight of sodium chlorate; and
 about 10 to 30% by weight of calcium hydroxide.

It has been found that the above composition provides excellent inflation of safety restraints within the necessary inflation times, the resulting gaseous mixture is essentially non-toxic, non-flammable and smokeless and has a relatively low flame temperature (e.g., less than about 2000° F.). The pyrotechnic ingredients themselves have relatively low toxicity and are readily available.

DESCRIPTION OF THE PREFERRED EMBODIMENTS

In accordance with a preferred embodiment of this invention, the pyrotechnic composition comprises:
 about 15 to 30, preferably about 20 to 25, weight percent of tartaric acid;
 about 40 to 75, preferably about 50 to 60, weight percent of sodium chlorate; and
 about 10 to 30, preferably about 15 to 20, weight percent of calcium hydroxide.

The tartaric acid component of the pyrotechnic composition of this invention provides the fuel for the combustion; the sodium chlorate is an oxidizer and the calcium hydroxide is a coolant. The composition of this invention may be prepared by any suitable powder or pellet blending process known to those skilled in the art. The composition of this invention preferably consists essentially of tartaric acid, sodium chlorate and calcium hydroxide. However, for example, since the resultant mixture is white in color and hence is highly reflective, it is preferred to include a pigment as a burn rate modifier. The preferred pigment is carbon black; other pigments that may alternatively be employed are black iron oxide, red iron oxide, black copper oxide and organic dyes. The amount of pigment in the composition may vary, but preferably is in the range of about 0.01 to 0.5 weight percent of the composition, more preferably about 0.05 to 0.15 weight percent.

It has been found that the pyrotechnic composition of this invention provides gaseous products which consist essentially of an optimum blend of oxygen, carbon dioxide and water vapor; such as about 25% $O_2$, 35% $CO_2$ and 40% $H_2O$, by volume. It is necessary to limit the amount of oxygen gas produced by the composition since it supports combustion and it is necessary to limit the amount of carbon dioxide produced because in high concentrations in a closed environment (e.g., a passenger compartment of a vehicle) it can be toxic.

In order to further describe the present invention, the following non-limiting example is given.

EXAMPLE

A pyrotechnic composition consisting of 22.7 weight percent tartaric acid, 18.6 weight percent calcium hydroxide, 58.6 weight percent sodium chlorate and 0.1 weight percent carbon black was intimately blended by wet ball milling and pressed into pellets. Eighty grams of the composition were used in a steering wheel "tank" test to determine the effectiveness of the composition as an air cushion pyrotechnic. In this test, the composition is ignited by an electroexplosive squib into a vessel measuring about 1 cubic foot in volume. The composition generated a pressure of 2600 psi in 40 milliseconds with a burn time of 35 milliseconds. The combustion temperature was about 2000° F. and the gas temperature was about 800° F. The gaseous output was determined to be as follows: on a volume basis; 24.2% $O_2$, 33.9% $CO_2$ and 41.9% $H_2O$.

Although it has been suggested in the aforementioned U.S. Pat. No. 3,785,149 to Timmerman to provide a pyrotechnic composition consisting essentially of an organic acid, such as citric (preferred) or tartaric acid and oxidizer such as potassium chlorate or perchlorate (preferred) or sodium chlorate, such patent does not disclose the three component composition of this invention. Indeed, the patent does not specifically suggest the combination of tartaric acid and sodium chlorate as a pyrotechnic composition or the beneficial results resulting from their combined use. Although zinc carbonate is suggested as a coolant in such patent, and preferably at a level of no more than about 5% by weight in order to provide non-toxic levels of carbon monoxide in the gas, the patent does not disclose the use of calcium hydroxide as a coolant. Furthermore, calcium hydroxide has a high decomposition temperature and thus generates less carbon dioxide than zinc carbonate.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A pyrotechnic composition comprising:
   from about 15 to 30% by weight of tartaric acid;
   from about 40 to 75% by weight of sodium chlorate; and
   from about 10 to 30% by weight of calcium hydroxide.

2. The composition of claim 1 wherein said composition comprises:
   from about 20 to 25% by weight of tartaric acid;
   from about 50 to 60% by weight of sodium chlorate; and
   from about 15 to 20% by weight of calcium hydroxide.

3. The pyrotechnic composition of claim 2 wherein said composition further includes about 0.01 to 0.5% by weight of a pigment.

4. The composition of claim 3 wherein said pigment is carbon black.

5. The composition of claim 4 wherein said carbon black is present in an amount of about 0.05 to 0.15% by weight.

6. A method of inflating an inflatable automobile safety restraint comprising the step of substantially completely inflating the restraint with the gaseous composition products of combustion of a composition comprising:
   about 15 to 30% by weight of tartaric acid;
   about 40 to 75% by weight of sodium chlorate; and
   about 10 to 30% by weight of calcium hydroxide.

7. The method of claim 6 wherein said composition comprises
   about 20 to 25% by weight of tartaric acid;
   about 50 to 60% by weight of sodium chlorate; and
   about 15 to 20% by weight of calcium hydroxide.

8. The method of claim 7 wherein said composition further includes from about 0.01 to 0.05% by weight of a pigment.

9. The method of claim 8 wherein said pigment is carbon black.

10. The method of claim 9 wherein said carbon black is present in an amount of about 0.5 to 0.15% by weight.

* * * * *

UNITED STATES PATENT AND TRADEMARK OFFICE
CERTIFICATE OF CORRECTION

PATENT NO. : 4,152,891
DATED : May 8, 1979
INVENTOR(S) : Eugene F. Garner

It is certified that error appears in the above–identified patent and that said Letters Patent are hereby corrected as shown below:

Col. 4, line 25 "0.05" should be -- 0.5 --.

Col. 4, line 30 "0.5" should be -- 0.05 --.

Signed and Sealed this

Second Day of October 1979

[SEAL]

Attest:

RUTH C. MASON
Attesting Officer

LUTRELLE F. PARKER
Acting Commissioner of Patents and Trademarks